Feb. 9, 1932.  O. J. KAY  1,844,320
THERMOSTATIC CONTROL FOR WATER HEATERS
Filed April 18, 1929
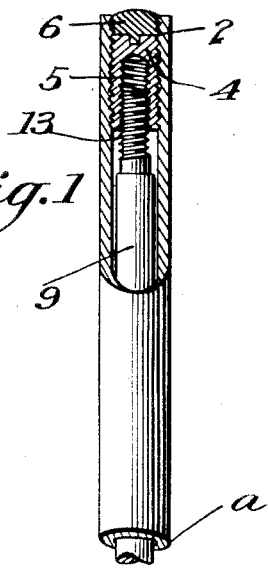
Fig. 1
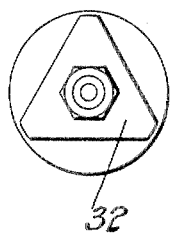
Fig. 2
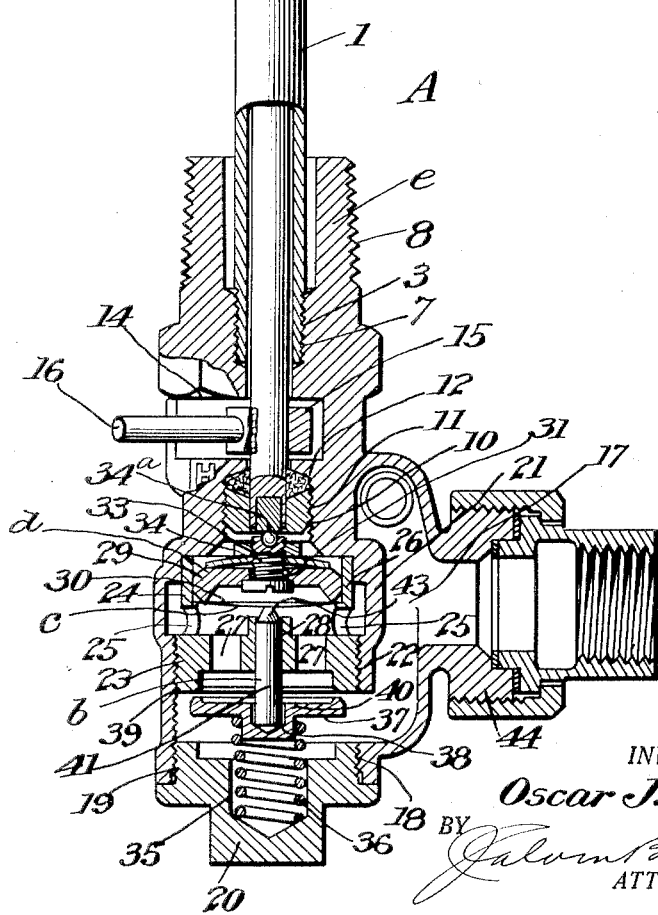
INVENTOR:
Oscar J. Kay,
BY
ATTORNEYS.

Patented Feb. 9, 1932

1,844,320

UNITED STATES PATENT OFFICE

OSCAR J. KAY, OF LOS ANGELES, CALIFORNIA, ASSIGNOR TO FEDERAL WATER HEATER CORPORATION, OF LOS ANGELES, CALIFORNIA, A CORPORATION OF CALIFORNIA

THERMOSTATIC CONTROL FOR WATER HEATERS

Application filed April 18, 1929. Serial No. 355,998.

This invention relates to thermostatic controls for hot water heaters, and has for an object the provision of a control so arranged and constructed as to permit ready adjustment of the control in accordance with temperature conditions.

Thermostatic controls are often sold separately from heaters, or heaters are shipped to different parts of the world, with the result that a thermostatic control which has been adjusted at the point of shipment will not always function properly at some other location, due to temperature difference. It is, of course, realized that the thermostatic control can be adjusted at each point, but this is not always easy of accomplishment by plumbers who are not entirely familiar with the control or the heater. It is with the idea of overcoming certain of these disadvantages that the present invention is primarily directed. Where a thermostatic control utilizes what is known as a snap action disc, such as, for instance, illustrated in the patent to William A. Merrick, No. 1,542,712, granted June 16, 1925, it is necessary that this snap action disc should have movement past its center within 15° or 20° temperature difference, and to accomplish this, the thermostat for such a control is usually set at approximately 150°. However, if the thermostat was set for one temperature in a given locality and the thermostat control and heater were shipped to a very cold climate, it is evident that considerable strain would be imposed upon the snapping disc. This is not desirable and to overcome this, certain prior investigators have attempted to utilize some form of lost motion device.

The present invention has for an object the provision of means adapted to be readily regulated, to the end that a snapping disc does not have undue strain imposed thereon.

A further object is the provision of a thermostatic control not utilizing a lost motion principle.

A further object is the provision of a thermostatic control adapted to operate at its original set temperature difference and regardless of climatic conditions.

Another object is the provision of a thermostatic control so arranged and constructed as to be easy of adjustment, economical in cost of manufacture, and generally superior.

With the above mentioned and other objects in view, the invention consists in the novel and useful provision, formation, construction, association and relative arrangement of parts, members and features, all as shown in a certain embodiment in the accompanying drawings, described generally and more particularly pointed out in the claims.

In the drawings:

Figure 1 is a vertical elevation, partly in section, of the improved thermostatic control, and, Figure 2 is a top plan view of an element of said thermostatic control.

Referring now with particularity to the drawings, the improved thermostatic control as an entirety is designated by A, and the same includes a thermostat $a$, valve means $b$, diaphragm $c$, and disc assembly means $d$, all of which elements are utilized in the preferred embodiment of the invention and which elements are in cooperation with other elements, as will hereinafter appear. The thermostatic part of the invention is conventional and includes an expansion tube 1 screw-threaded internally at one end at 2 and externally at the opposite end at 3, the end 2 receiving a bushing 4 which is internally screw-threaded at 5. A lock nut 6 maintains the bushing against rotation within the expansion tube. The opposite end of the expansion tube is screw-threaded to internal threads 7 of a housing $e$. This housing is formed to confine the elements $b$, $c$, and $d$. The housing is provided with a tapered screw-thread 8 whereby this portion may be inserted within a boiler, not shown, in the usual manner and so that the expansion tube is within the fluid to be heated and directly affected as to its expansion by the heat of said fluid. Within the expansion tube is what is termed a push rod 9, this rod forming a portion of the thermostat $a$ and this rod extends within the housing. More particularly, the said housing is formed with a central bore, one portion of which is screw-threaded at 10 to receive a packing nut 11 adapted to confine packing 12, and the lower end of the push rod is passed through said packing and said nut. The opposite end of the push rod is reduced as to diameter and screw-threaded, as shown at 13, this screw-threaded portion being adapted for screw-threaded engagement with the threads 5 of the bushing 4. Thus, it will be seen that the thermostat *a* is securely held to the housing *e*. This housing is provided with a segmental slotted or cut-away portion 14, which exposes a portion of the push rod 9. An adjusting collar 15 is secured to said push rod and an adjusting lever 16 is fastened to the collar so that movement of the lever will, through the medium of the collar 15, cause rotation of the push rod, which rotation due to the screw-threaded engagement between the bushing 4 and the part 13 causes an adjusting movement of said push rod within the expansion tube.

The said housing is provided with an enlarged chamber portion 17, entrance to which may be effected through an opening 18. The wall bounding said opening is screw-threaded at 19 for reception of the plug 20. This opening is in substantial alignment with the central bore of the housing. Furthermore, the housing is provided with a depending portion at 21 within the chamber and which portion, in combination with other portions of the housing, is substantially an annulus. The part 21 is screw-threaded at 22. This part 21 is adapted to house, in part, the means *c* and *d*, and the annular opening of this part 21 is in substantial alignment with the central opening for the push rod. A valve seat 23 of cage-like form is screw-threaded to the threads 22, and this valve seat is adapted to spacedly carry a ring 24, and which ring is provided with one or more transverse openings 25. Furthermore, this ring is formed with an annular shoulder 26. The valve seat member is provided with one or more transverse openings 27, and the said member is likewise centrally bored at 28. Adapted to rest on the ledge or shoulder 26 is the diaphragm *c*, this diaphragm being of the snap type, which is to say, it is bowed in construction to the end that when pressure is exerted against the diaphragm, the same will snap past a center plane and upon releasing the pressure, the diaphragm will again assume its bowed position, as shown in the drawings. The means *d* is adapted to cause the diaphragm to snap from its bowed position, and this means includes a rigid bridge 29 guided as to movement and confined within the annulus 24. This bridge is provided with an annular flange at 30, the cross-section of which is triangular with the apex of the triangle in engagement with the diaphragm and spaced inwardly from the circumference of said diaphragm. This bridge is formed with a central opening 31. A bowed leaf spring 32 is adapted to engage the top surface of said bridge and said spring is formed with a central opening. A screw 33 is passed through the central opening of the bridge and the spring and a nut 34 secured to threads of said screw acts in a dual capacity of holding the spring to the bridge and for the adjustment of spring tension of said valve 32 relative to the bridge. This nut carries at one end a roller member 34*a*.

The plug 20 is chambered at 35 so as to confine a coil spring 36. A valve disc 37 formed with a shank 38 is urged to seated position against the seat 39 of the valve seat member 23. The coil spring, of course, surrounds the shank 38. This valve disc is formed with a central bore 40 and received within said bore is a stem 41 and which stem is passed through the central opening 28 of the valve seat member. This stem has a frusto-conical end portion 43 which is directly beneath the center of the diaphragm. The housing is provided with a union member 44, which permits entrance within the chamber 17 from some external connection. In this case, it would permit the passage of some burnable fluid, such as gas, within the chamber, and an outlet member would be associated with the chamber portion bounded by the annulus 21. The outlet member would, of course, be connected to the burner of the heater.

The operation, uses and advantages of the invention just described are as follows:

If we assume that the thermostatic element *a* is within some heater boiler, whereby the thermostatic element will act responsive to heat changes, it is evident that the push rod will move in accordance with expansion and contraction of the tube 1. In the drawings, the tube 1 has contracted, and this contraction has directly affected the rod 9 so that the same pushes upon the disc assembly *d* which in turn snaps the diaphragm *c* into the position shown, which diaphragm in turn forces the stem 41 downwardly against the spring 36 to open the valve 37. As the water or other fluid becomes hot, the tube 1 begins to expand and relieve the pressure exerted by the rod 9 against the disc assembly *d*, and when this pressure has been relieved a definite amount, the diaphragm *c* will snap back and permit the disc 37 to seat and shut off the supply of gas leading to the burner. As pointed out in the first part of the specification, the thermostatic element, and particularly the push rod, moves against the disc assembly when the expansion tube contracts. In very cold climates, movement of the push rod would, in some instances, entirely spoil a diaphragm due to excessive contraction of the expansion tube. To overcome this, the leaf spring 32 is provided for the bridge 29, this bridge bearing against the diaphragm. It has been found that the motion necessary to push the diaphragm over its center should be governed by approximately 15° to 20° temperature difference, and that the thermostat for the water heater should be set at approximately 150° F. Now, if the thermostat were shipped into a cold climate, and allowing for the temperature difference above stated, the thermostatic element would have a temperature change of approximately 200° F. or more. This, of course, would result in damage to the diaphragm. Hence, the provision of the disc spring 32 on the bridge aids in overcoming this temperature difference. The screw 33 is tightened relative to the nut, so as to clamp the disc spring to the bridge with a predetermined tension. The thermostatic element will, through the rod 9, exert this predetermined tension onto the diaphragm through the bridge to push the diaphragm over its center and any additional tendency due to temperature change will be taken up by the spring 32 on the top of the bridge, to the end that the diaphragm is relieved from any excess pressure. The adjusting stem may be moved over a given arc to regulate the general pressure exerted by the push rod against the ball 34 and the spring.

It is apparent that there is no lost motion so far as the thermostatic element is concerned between the push rod and the bridge. Practically any degree of tension desired within defined limits may be exerted by the non-expansible element of the thermostat, namely, the push rod against the disc assembly $d$ by turning the said rod through the medium of the adjusting stem.

It is obvious that various changes and modifications and variations may be made in practicing the invention in departure from the particular showing of the drawings without departing from the true spirit of the invention.

I claim:

1. In a thermostatic control for a gas valve, the combination of a casing, a snap diaphragm mounted in said casing, a gas valve in the casing mounted so as to close by a movement toward the diaphragm, a valve spring associated with the valve and urging the same to close, a stem connected with the valve guided in the casing and having its end engaging the snap diaphragm so that the snap diaphragm may prevent the valve from closing, a thermostat element mounted in the casing adjacent the face of the diaphragm opposite to the valve, a push-rod connected with the thermostat element, a rigid bridge member resting against the diaphragm, a bowed leaf spring, means for securing the spring against the bridge member including a part that receives the thrust of the push-rod, said parts cooperating so that expansion of the thermostat element may permit the valve spring to close the valve, the second-named spring operating to limit the pressure of said member against the diaphragm if the thermostat element contracts unduly.

2. In a thermostatic control for a gas valve, the combination of a casing, a snap diaphragm mounted in said casing, a gas valve in the casing mounted so as to close by a movement toward the diaphragm, a valve spring associated with the valve and urging the same to close, a stem connected with the valve, guided in the casing and having its end engaging the snap diaphragm so that the snap diaphragm may prevent the valve from closing, a thermostat element mounted in the casing adjacent the face of the diaphragm opposite to the valve, a push-rod connected with the thermostat element, a rigid bridge member resting against the diaphragm, a bowed leaf spring between the rigid member and the push-rod, a screw for securing the leaf spring to the bridge member, means for imparting the thrust of the push-rod to the bridge member through the said leaf spring, said parts cooperating so that expansion of the thermostat element may permit the valve spring to close the valve, the said leaf spring operating to limit the pressure of said member against the diaphragm if the thermostat element contracts unduly.

3. In a thermostatic control for a gas valve, the combination of a push-rod controlled by the thermostat, a gas valve mounted to close by a movement toward the push-rod, a spring for closing the gas valve, a snap diaphragm between the push-rod and the valve and operating when it snaps toward the valve, to open the valve, a rigid member between the diaphragm and the push-rod, a leaf spring between the rigid member and the push-rod, and means for imparting thrust from the push-rod to the rigid member through the leaf spring, said parts cooperating so that expansion of the thermostat element may permit the valve spring to close the valve, said leaf spring operating to limit the pressure of said member against the diaphragm if the thermostat element contracts unduly.

4. In a thermostatic control for a gas valve, the combination of a push-rod controlled by the thermostat, a gas valve mounted to close by a movement toward the push-rod, a spring for closing the gas valve, a snap diaphragm between the push-rod and the valve and operating when it snaps toward the valve, to open the valve, a rigid member between the diaphragm and the push-rod, a leaf spring between the rigid member and the push-rod, and means for imparting thrust from the push-rod to the rigid member through the leaf spring, said parts cooperating so that expansion of the thermostat element may permit the valve spring to close the valve, said leaf spring operating to limit the pressure of said member against the diaphragm if the thermostat element contracts unduly, said push-rod having threads for supporting the same and for enabling the relation of the push-rod to the diaphragm to be adjusted, and a lever connected with the push-rod for rotating the same.

5. In a thermostatic control for a gas valve, the combination of a casing, a snap diaphragm mounted in said casing, a gas valve in the casing mounted so as to close by a movement toward the diaphragm, a valve spring associated with the valve and urging the same to close, a stem connected with the valve, guided in the casing and having its end engaging the snap diaphragm so that the snap diaphragm may prevent the valve from closing, a thermostatic element mounted in the casing adjacent the face of the diaphragm opposite to the valve, a push-rod connected with the thermostatic element, a rigid bridge member resting against the diaphragm, a spring between the rigid member and the push-rod, a screw for securing the spring to the bridge member, means for imparting the thrust of the push-rod to the bridge member through the said spring, said parts cooperating so that expansion of the thermostat element may permit the valve spring to close the valve, the said second mentioned spring operating to limit the pressure of said member against the diaphragm if the thermostatic element contracts unduly.

In testimony whereof, I have signed my name to this specification at Los Angeles, California, this 23rd day of February, 1929.

OSCAR J. KAY.